United States Patent
Saadat et al.

(10) Patent No.: US 12,424,960 B2
(45) Date of Patent: Sep. 23, 2025

(54) ACTIVATION SYSTEM AND METHOD FOR OPERATING AN ELECTRIC MACHINE

(71) Applicant: SEG Automotive Germany GmbH, Stuttgart (DE)

(72) Inventors: Nima Saadat, Stuttgart (DE); Murugaperumal Devaraja, Stuttgart (DE); Christian Riecken, Stuttgart (DE); Timm Lohmann, Stuttgart (DE); Kaveh Haghverdi, Stuttgart (DE); Christian Stigler, Stuttgart (DE); Felix Egbert, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 161 days.

(21) Appl. No.: 18/524,293

(22) Filed: Nov. 30, 2023

(65) Prior Publication Data
US 2024/0178781 A1 May 30, 2024

(30) Foreign Application Priority Data
Nov. 30, 2022 (DE) .......................... 102022131772.2

(51) Int. Cl.
*H02P 6/17* (2016.01)
*H02P 9/00* (2006.01)
*H02P 9/08* (2006.01)
*H02P 25/22* (2006.01)
*H02P 27/06* (2006.01)

(52) U.S. Cl.
CPC .............. *H02P 25/22* (2013.01); *H02P 9/006* (2013.01); *H02P 9/08* (2013.01); *H02P 27/06* (2013.01)

(58) Field of Classification Search
CPC .. H02P 25/22; H02P 9/006; H02P 9/08; H02P 27/06; H02H 7/0844
See application file for complete search history.

(56) References Cited

U.S. PATENT DOCUMENTS

| 2013/0193903 A1* | 8/2013 | Illiano | H02P 9/123 318/716 |
| 2017/0222591 A1* | 8/2017 | Flynn | H02P 25/04 |
| 2020/0350848 A1* | 11/2020 | Gusyev | H02P 29/027 |

FOREIGN PATENT DOCUMENTS

| DE | 10 2021 133 298 A1 | 6/2023 |
| FR | 2 944 398 A1 | 10/2010 |

* cited by examiner

*Primary Examiner* — Muhammad S Islam
(74) *Attorney, Agent, or Firm* — Cozen O'Connor (57) ABSTRACT

An activation system for operating an electric machine includes a control circuit device for activating a rotor winding, and having a highside switch, a semiconductor component, and a de-excitation switch. A first terminal of the rotor winding is connectable to a positive supply terminal via the highside switch and to a negative supply terminal via the semiconductor component. A second terminal of the rotor winding is connectable to the negative supply terminal via the de-excitation switch. The activation system is configured to attain a secure state, when at least one fault is present, by disconnecting the rotor winding from the positive supply terminal and/or by de-exciting the rotor winding. A diagnosis may be carried out using an additional highside switch supplied with power via another activation circuit, and/or a fault detection circuit is provided, whose output signal does not change during a de-excitation.

12 Claims, 7 Drawing Sheets

ACTIVATION SYSTEM AND METHOD FOR OPERATING AN ELECTRIC MACHINE

CROSS-REFERENCE TO RELATED APPLICATIONS

This application claims priority to German Patent Application No. 102022131772.2 filed Nov. 30, 2022, titled "Activation system and method for operating an electric machine," which is hereby incorporated in its entirety.

The present invention relates to activation systems and to a method for operating an electric machine including a rotor winding and a stator winding, and to an electric machine.

BACKGROUND OF THE INVENTION

Electric machines may be used to convert mechanical energy into electrical energy, and vice versa, in a motor vehicle. A converter (or inverter) is customarily used to activate or operate the electric machine, and in particular with regard to phases of the stator winding. Typical electric machines have, for example, three, five, seven, or even more phases. For this purpose, for each phase the converter generally has one half bridge, which in turn includes in each case two switches, for example MOSFETs, IGBTs, or other semiconductor components. In addition, an activation circuit that is used to activate the individual switches of the half bridges may be provided; these involve gate driver circuits, for example. In this way, for example a direct voltage that is provided by a vehicle electrical system, a battery, or a fuel cell may be converted into an alternating voltage for the stator winding; likewise, the converter may be used conversely, for example in the sense of a rectifier.

Electric machines may be equipped with electrical excitation; i.e., a rotor winding (or excitation winding) is provided. For activating the rotor winding, a control circuit device which is connected to the rotor winding may be provided. Such a control circuit device generally includes at least one switch, for example a MOSFET, IGBT, or some other semiconductor component, to allow voltage, for example from the vehicle electrical system or the battery, to be applied to the rotor winding, for example to switch an excitation current on and off. However, a half bridge that includes two switches, a highside switch and a lowside switch, may also be used here. Here as well, an activation circuit that is used to activate the switch or switches, i.e., a so-called gate driver circuit, may be provided.

Depending on the type of electric machine and the number of phases of the stator winding, one or more of these activation circuits (gate driver circuits) may be used overall to activate the control circuit device and the half bridges of the converter. An activation circuit may thus also activate multiple half bridges, for example those of the control circuit device and, for example, two of the converter.

The one or more activation circuits may in turn be connected to a processing unit such as a microcontroller unit (MCU) or an engine control unit, for example via a so-called serial peripheral interface (SPI). From there, the activation circuits may receive and implement appropriate activation commands.

DISCLOSURE OF THE INVENTION

According to the invention, activation systems, a method for operating an electric machine, and an electric machine having the features of the independent claims are proposed. Advantageous embodiments are the subject matter of the subclaims and of the following description.

The invention concerns the operation of an electric machine including a rotor winding and a stator winding, in particular using an activation system that includes a control circuit device and in particular also a converter, and optionally one or more associated activation circuits, as explained in greater detail at the outset.

Protective functions may be provided for protecting the electric machine, the activation system including the converter, the control circuit device, and its activation circuits, as well as the processing unit or the vehicle electrical system, and possibly including other consumers, in the event of a fault. Examples of such faults or abnormal conditions are overcurrent or overvoltage. When such a fault is detected, the entire activation system or individual components may be informed of such; this may take place via the activation of a shutdown path so that the activation system goes into a secure state. In this case, for example, the rotor winding is to be disconnected from the vehicle electrical system and discharged.

For the converter, in this regard a secure state is understood to mean in particular the interruption of a current flow into the electrical system of the vehicle, either by short-circuiting the phases of the electric machine or by use of passive methods, for example Zener diodes.

A process in which some or all phases of the electric machine are intentionally short-circuited is also referred to as an active short circuit or active phase short circuit. For example, generally either all highside switches (switches that connect the phases to the positive terminal or positive pole of the vehicle electrical system voltage) of the half bridges of the converter, or all lowside switches (switches that connect the phases to the negative terminal or negative pole of the vehicle electrical system voltage (ground)) of the half bridges of the converter, are simultaneously closed (conductively switched). The respective other switches are then generally opened in each case (nonconductively switched).

The discharging of the rotor winding or of the energy stored therein (so-called de-excitation) generally takes place (for a half bridge in the control circuit device, for example) by opening the switch via which the rotor winding is connected to the positive terminal or positive pole of the vehicle electrical system voltage, the so-called B+ (highside switch); the main supply is thus disconnected from the excitation circuit (the circuit with the rotor winding or excitation winding). The other switch (lowside switch, which is suitably activated during controlled operation) is closed, and a further switch (a de-excitation switch, which is closed during normal operation) is opened for the de-excitation, so that the current can flow across an electrical resistor (discharge resistor), which is connected, for example, in parallel to the safety switch (which then results in a circulating current in a de-excitation circuit), and the current is thus reduced. In this regard, it is noted that some other semiconductor component, such as a (free-wheeling) diode, may be used instead of the lowside switch.

Various signals, which are queried, may be used to detect faults. Such signals may include, for example, an error signal for each activation circuit (gate driver circuit), an external error signal that comes from the outside, for example, and a general permission signal that comes from the MCU, for example.

In the normal state, i.e., when no error is present during operation of the electric machine, these signals may all deliver the value 1, for example. By use of an AND operation in a query (in an error detection circuit), the safety switch may thus remain closed. As soon as the value of one of the signals changes, for example to 0, the safety switch is opened.

However, in such an activation system for operating an electric machine, various faults or problems may arise which cannot, or which cannot be sufficiently, eliminated using the options explained above; i.e., a secure state cannot be attained. Such faults are described below.

a) For a fault in the highside switch of the control circuit device (continuously "on," for example), the secure state cannot be ensured because the rotor winding (excitation coil) cannot be disconnected from the power supply (i.e., B+).

b) For a fault in the lowside switch of the control circuit device (i.e., an interruption in both directions), the secure state cannot be ensured because a current is not possible during the de-excitation, i.e., the de-excitation circuit cannot be formed or closed.

c) If an error detection circuit or a fault detection circuit cannot detect the fault, the secure state cannot be attained simply due to the lack of detection of a fault d) The occurrence of an internal fault in the activation circuits (gate driver circuits) may result in the activation circuit not being able to respond in the event of overvoltage or some other fault. A secure state therefore cannot be attained with an individual fault. Thus, higher safety levels likewise cannot be attained.

e) Gate driver circuits cannot implement an active short circuit (ASC) independently of the MCU. However, the MCU is not a reliable unit for creating all conditions or carrying out actions necessary for an active short circuit; for example, a gate driver circuit cannot implement an active short circuit if there is a problem with the MCU.

f) Gate driver circuits cannot inform other gate driver circuits about requirements for an active short circuit. In the event of a fault, the communication via SPI is generally not reliable enough.

g) A fault in a current sensor of the excitation circuit may result in an interruption in the de-excitation circuit, and may thus cause high overvoltage.

h) In addition, monitoring of a potential overvoltage at the so-called terminal 40 (positive cable of a 48 V battery) is difficult.

Within the scope of the present invention, various options are now proposed via which one or more of the above cases, in which faults do not result in the secure state, may be eliminated or avoided. In particular, the various proposed options may also be combined or used together.

According to one aspect of the invention, the highside switch is redundantly designed by providing an additional highside switch that is connected in series with the highside switch. A reliable disconnection of the rotor winding from the positive supply terminal (B+) is thus possible, even if one of the highside switches is defective, or is to be continuously conductive or otherwise cannot be opened (continuously "on").

For this additional highside switch, an activation circuit (gate driver circuit) is provided which is supplied with energy via at least one other activation circuit or partial activation circuit of the activation system, in particular according to the so-called bootstrap principle. The bootstrap principle allows a floating voltage for the additional highside switch. During normal operation the additional highside switch is closed (conductive), but cannot be opened by the activation circuit. This other activation circuit or partial activation circuit may, for example, be an activation circuit for activating switches of a converter of the electric machine, i.e., of various phases (via corresponding half bridges in the converter) or of a certain phase, or additionally or alternatively, for activating an activation circuit for at least the highside switch (and possibly the lowside switch) of the control circuit device. These could then optionally be connected to a corresponding capacitor via the so-called bootstrap principle, for example. In general, activation circuits may, for example, be provided separately for a half bridge (of the converter or the control circuit device, for example); such an arrangement may then also be used for activating the additional highside switch. However, an activation circuit may also be provided for activating multiple, for example three, half bridges. It is then likewise possible to use this activation circuit, or also only a portion thereof—a partial activation circuit—for this purpose, for example the portion for a certain half bridge or phase.

The activation system may also be configured, for the activation of the additional highside switch, to receive an output signal of a fault detection circuit, and based on the output signal to switch the additional highside switch. A further semiconductor switch, as explained in greater detail below, may be provided for this purpose. Reference is made to the following discussion for an explanation of the fault detection circuit and the output signal.

According to a further aspect of the invention, the activation system includes a fault detection circuit (the above-mentioned fault detection circuit, for example), which is configured to bring about attainment of the secure state by means of an output signal, in particular by de-exciting the rotor winding for a connected rotor winding. The disconnection of the rotor winding from the positive supply terminal may then take place, for example, by activating the highside switch of the control circuit device or, if necessary, by activating the mentioned additional highside switch (for example, using the output signal as described above).

In general, the fault detection circuit may check or query, for example, various, in particular safety-relevant, signals, and for example if one of the signals is not present or is not present with the required value, may then output the output signal.

Furthermore, the activation system is configured, when the rotor winding is de-excited via the de-excitation circuit, to not change the output signal of the fault detection circuit until the rotor winding is de-excited to a predefined threshold value, preferably completely de-excited. This may preferably take place by activating a switching mechanism during the de-excitation, in particular by generating a switching signal that ensures that the output signal of the fault detection circuit is not changed. A premature reset or restart of the output signal (which may be a safety signal), which would possibly interrupt the de-excitation, is thus avoided.

According to a further aspect of the invention, the activation circuit is configured, before and/or during a start-up of normal operation (of the electric machine, for example), to carry out a diagnosis to check a functionality for attaining the secure state when a fault is present. This enables an increase in security, since in the event that a provided fault mechanism for attaining the secure state does not function properly, the electric machine does not have to be started at all, or also is not allowed to be started, and potential faults also correspondingly do not result.

The diagnosis may check one or more various aspects, which are explained briefly below. A more detailed explanation is provided with reference to the figures. The diagnosis includes in particular checking a functionality of the additional highside switch and/or of the activation circuit for the additional highside switch. The diagnosis also preferably includes checking a functionality of the highside switch and/or of the semiconductor component designed as a lowside switch and/or of the activation circuit for the highside switch and/or the lowside switch. The diagnosis may also include checking a functionality of the de-excitation switch and/or of an activation circuit for the de-excitation switch. In addition, the diagnosis may include checking a functionality of the activation system not changing the output signal of the fault detection circuit until the rotor winding is de-excited to a predefined threshold value, preferably completely de-excited.

For example, at least one diode, in particular a TVS diode or Zener diode that is present in the de-excitation circuit, may be connected in parallel to the de-excitation switch. Two (or more) diodes connected in series may also be used in parallel to the de-excitation switch. The discharge resistor mentioned above may thus be dispensed with. Namely, the de-excitation may then take place via one or more of these diodes. Faster de-excitation is achieved with TVS diodes, in particular compared to the use of a discharge resistor. Alternatively, Zener diodes may also be used to achieve the same effect.

In this case, the diagnosis may include checking a functionality of the at least one diode.

It is also advantageous when at least one diode is connected in parallel to the lowside switch, if present. Multiple diodes are in each case preferably connected in parallel to the lowside switch (i.e., connected to one another and to the switch in parallel). This increases the reliability and robustness of the circuit. If the lowside switch fails, these diodes may guarantee the continuity of the de-excitation circuit and also reduce the thermal stress on the lowside switch.

It is also advantageous when an additional de-excitation switch is connected in series with the de-excitation switch. There as well, at least one diode, in particular a TVS diode or Zener diode that is present in the de-excitation circuit, may then be connected in parallel. By use of two de-excitation switches, for example MOSFETs, with their parallel diodes, if one of these switches or diodes or diode sets fails, the other switch with the diode can always assist with the de-excitation operation.

The control circuit device preferably includes a measuring point, in particular a measuring shunt, that is provided between the second terminal of the rotor winding and the negative supply terminal of the activation system or connected there. Thus, the measuring point or measuring shunt is, for example, connected in series with the de-excitation switch and/or the further de-excitation switch. In addition, in particular a current measuring device and/or overcurrent measuring device are/is then provided which are/is configured to detect a current in the excitation winding across the measuring point and to bring about attainment of the secure state, at least when a predetermined threshold value of the measured current is exceeded.

A frequent fault with a measuring shunt is an open circuit; therefore, a parallel (further) measuring shunt (with a corresponding current measuring device) may ensure the current path for excitation current and de-excitation current, as well as the monitoring of the excitation current. In addition, the connection to the mentioned at least one diode may be such that it is not disconnected, even in the event of a fault of the measuring point or measuring shunt (with which the at least one diode is then also in parallel).

In the ways described, it is possible for one or more of the above-mentioned faults to still be detected, or for the secure state to still be attained. At this point it is noted that the various proposed precautionary measures may be used individually, in any given combination, or together.

The invention further relates to an electric machine including a rotor winding and a stator winding, and to an activation system according to the invention.

The invention further relates to a method for operating an electric machine including a rotor winding and a stator winding, using an activation system according to the invention. If at least one fault is present during operation, a secure state is attained by disconnecting the rotor winding from a positive supply terminal and/or de-exciting the rotor winding.

With regard to the advantages and further embodiments of the electric machine and of the method, to avoid repetitions reference is made to the above statements concerning the activation system, which correspondingly apply here.

Further advantages and embodiments of the invention result from the description and the appended drawings.

The invention is schematically illustrated in the drawings, based on exemplary embodiments, and described below with reference to the drawings.

EMBODIMENTS OF THE INVENTION

Figure 1:
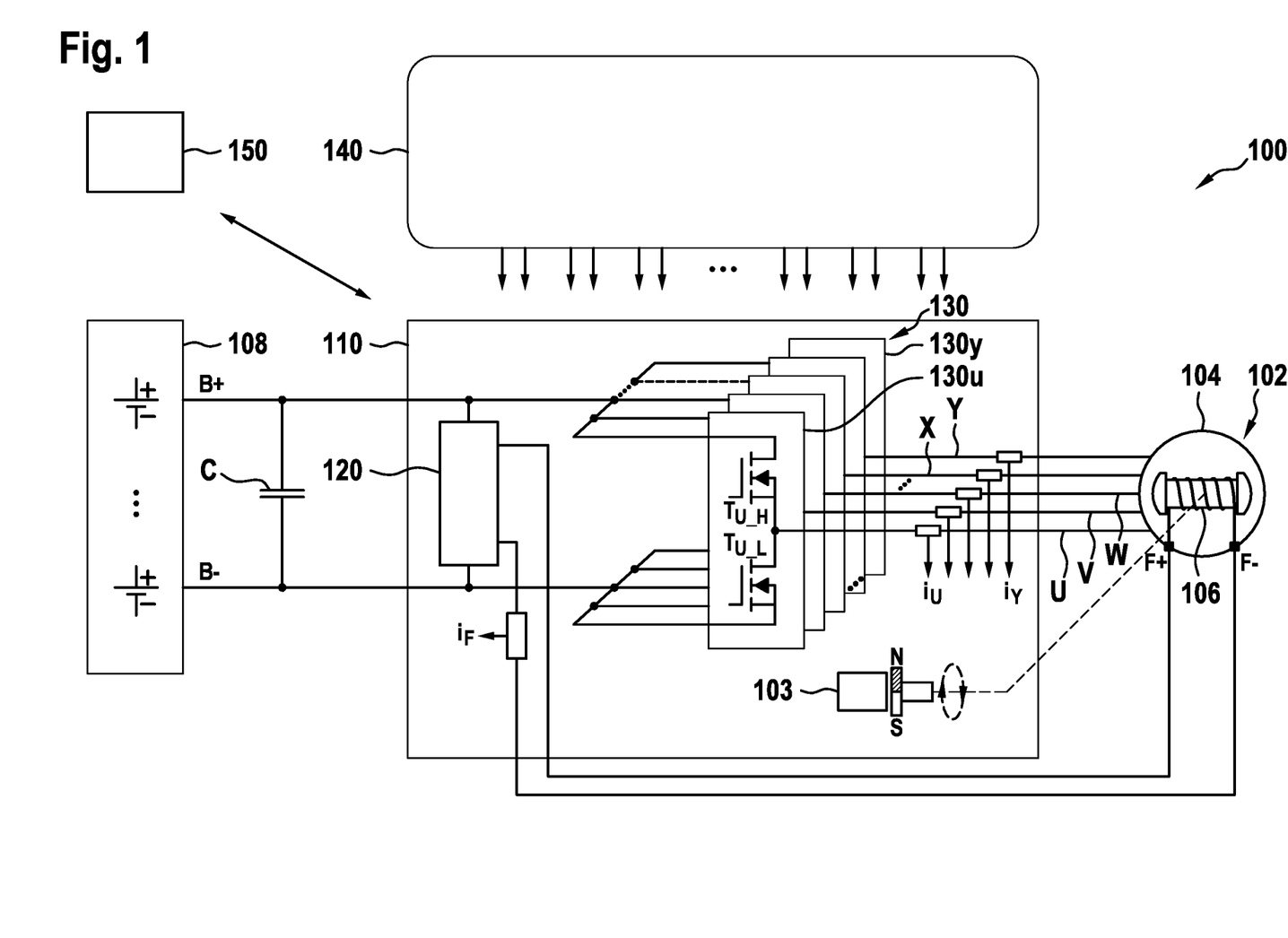
FIG. 1 shows a circuit diagram of a vehicle electrical system with an activation system for operating an electric machine, upon which the invention may be based.

FIG. 1 shows a circuit diagram of a vehicle electrical system 100, in particular of a (motor) vehicle, including an electric machine 102 with a stator winding 104 and a rotor winding 106, by way of example also including a position sensor 103, and a battery or an energy store 108 (a battery, for example) with a positive vehicle electrical system terminal B+ and a negative vehicle electrical system terminal B− (ground), which are used as the positive supply terminal (positive pole) and negative supply terminal (negative pole), respectively. In addition, a DC link capacitor C (of which there may also be several) is provided.

As an example, this is a five-phase electric machine 102 with the five phases U, V, W, X, and Y or corresponding phase windings. It is understood that the invention may also be implemented with other electric machines having a different number of phases, for example three or six, etc.

Figure 2:
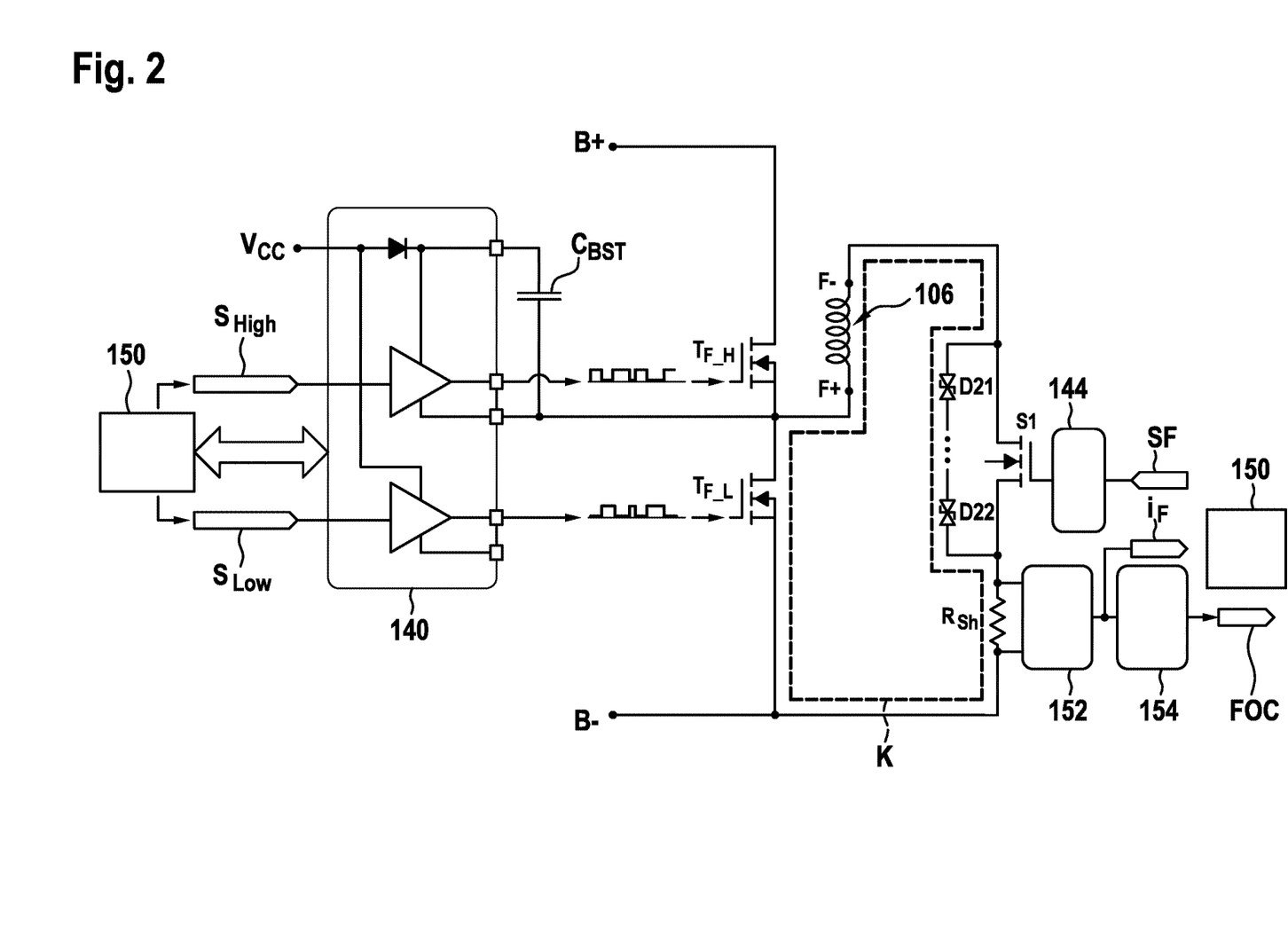
FIG. 2 shows a portion of the activation system from FIG. 1 in a more detailed view.

Furthermore, an activation system 110 is provided, which includes a voltage regulator or a control circuit device 120 that is provided for applying an excitation current to the rotor winding 106 or regulating same. For this purpose, the rotor winding with its first terminal F+ and its second terminal F− may be connected to the control circuit device 120. The control circuit device 120 has two switches for this purpose (a highside switch and a lowside switch), which are shown in FIG. 2.

Moreover, a converter (or inverter) 130 is provided, which for each phase includes a half bridge (as an example, the half bridge 130$u$ is denoted for phase U, and the half bridge 130[$y$] is denoted for phase Y) that includes two switches (a highside switch and a lowside switch), for example MOSFETs or IGBTs. These switches are denoted by reference symbols $T_{U\_H}$ and $T_{U\_L}$ for the respective highside switch and lowside switch of phase U; the same correspondingly applies for the switches of the other phases V, W, X, and Y.

In addition, an activation circuit or gate driver circuit 140 is provided. The activation circuit 140 may activate 12 semiconductor switches, for example, and for this purpose is connected in each case to one of the control terminals or gate terminals in question (indicated by arrows). As an example, the activation circuit 140 activates the two switches of the control circuit device 120 and the switches of phases U, V, W, X, and Y. It is noted that two or more activation circuits may be provided instead of a single activation circuit. Thus, for example, a first activation circuit could activate the two switches of the control circuit device 120 and the switches of phases U and V, whereas a second activation circuit could activate the switches of phases W, X, and Y. The activation circuits 140 may, for example, receive signals from a higher-order processing unit 150 such as an MCU, or may transmit the signals to the processing unit. In addition, for example each phase or the switches of the control circuit device 120 may be activated by means of a separate activation circuit or a separate gate driver circuit (in the example of the five-phase electric machine shown, six activation circuits would be necessary).

Furthermore, the phase currents $i_U$ and $i_Y$ for phases U and Y, respectively, as well as the excitation current $i_F$ are shown by way of example. The other phase currents may also be measured. For this purpose, for example suitable measuring devices may be provided. Reference symbol $V_{DC}$ denotes a tap of the positive supply voltage (across B+).

FIG. 2 illustrates a portion of the activation system 110 from FIG. 1 in a more detailed view, and in particular shows the control circuit device 120. In particular the highside switch $T_{F\_H}$ and the lowside switch $T_{F\_L}$ are shown, which are activated via the activation circuit 140, depicted here by pulses by way of example. The activation circuit 140 may in turn be prompted by the MCU 150 to appropriately activate the highside HS and the lowside LS, indicated here by the signals $S_{High}$ and $S_{Low}$. The highside switch $T_{F\_H}$ and the lowside switch $T_{F\_L}$ form a half bridge or are part of a half bridge. In addition, a power supply $V_{CC}$ of the activation circuit for controlling the lowside switch is connected via a capacitor $C_{BST}$ for controlling the highside switch.

The highside switch $T_{F\_H}$ is situated between the first terminal F+ of the rotor winding 106 and the positive supply terminal B+ of the activation system. The lowside switch $T_{F\_L}$ is situated between the first terminal F+ of the rotor winding and the negative supply terminal B− of the activation system. In addition, a de-excitation switch S1 is situated between the second terminal F− of the rotor winding and the negative supply terminal B− of the activation system.

During normal operation, by closing (conductively switching) the lowside switch $T_{F\_L}$ and opening (nonconductively switching) the de-excitation switch S1, a de-excitation circuit may be formed via which the rotor winding 106 is de-excitable. Such a de-excitation circuit is denoted by reference symbol K, and by way of example contains two diodes D1 and D2, for example TVS diodes, connected in parallel to the de-excitation switch S1. In general, a discharge component such as a resistor, for example, could be provided instead of the diodes.

The activation system 110 is further configured to attain a secure state, when at least one fault is present, by disconnecting the rotor winding 106 from the positive supply terminal B+ and/or de-exciting the rotor winding. For this purpose the highside switch $T_{F\_H}$ may be opened and/or the de-excitation switch S1 may be opened.

It is provided that when a fault is present, the activation circuit 144 for the de-excitation switch is activated to open the de-excitation switch. An error signal SF, for example, may be used for this purpose.

In addition, a measuring resistor or measuring shunt $R_{sh}$ with which a current measuring device 152 for measuring the excitation current $i_F$ is associated is provided in series with the parallel connection of the de-excitation switch S1 and the diodes D1, D2. In general, a type of current measuring device other than the measuring shunt $R_{sh}$ and the current measuring device 152 may be provided for this purpose. The measured excitation current $i_F$ may be transmitted to the MCU 150. Likewise, an overcurrent measuring device 154 may be provided which, at least when a predetermined threshold value of the measured current is exceeded, causes the secure state to be attained. Here an error signal FOC (overcurrent in the excitation winding) is output which optionally may then be appropriately processed.

As explained, with such an activation system various faults or problems may arise which cannot, or cannot be sufficiently, eliminated using customary options; i.e., a secure state cannot be attained. Based on the activation circuit 110 shown in FIGS. 1 and 2, various preferred embodiments of the invention are now explained with reference to the following figures.

Figure 3A:
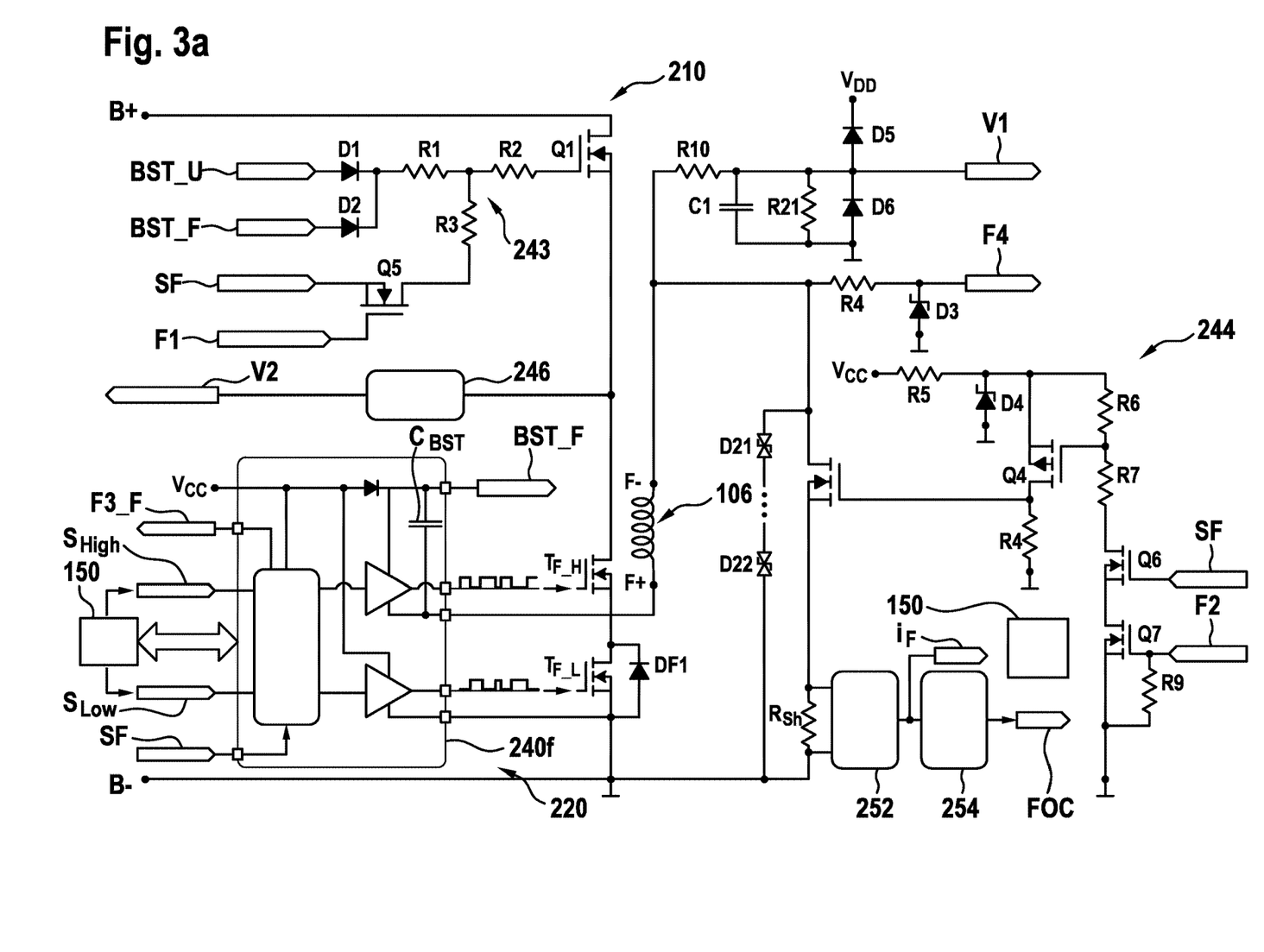
FIGS. 3a and 3b show one preferred embodiment of an activation system according to the invention.
Figure 3B:
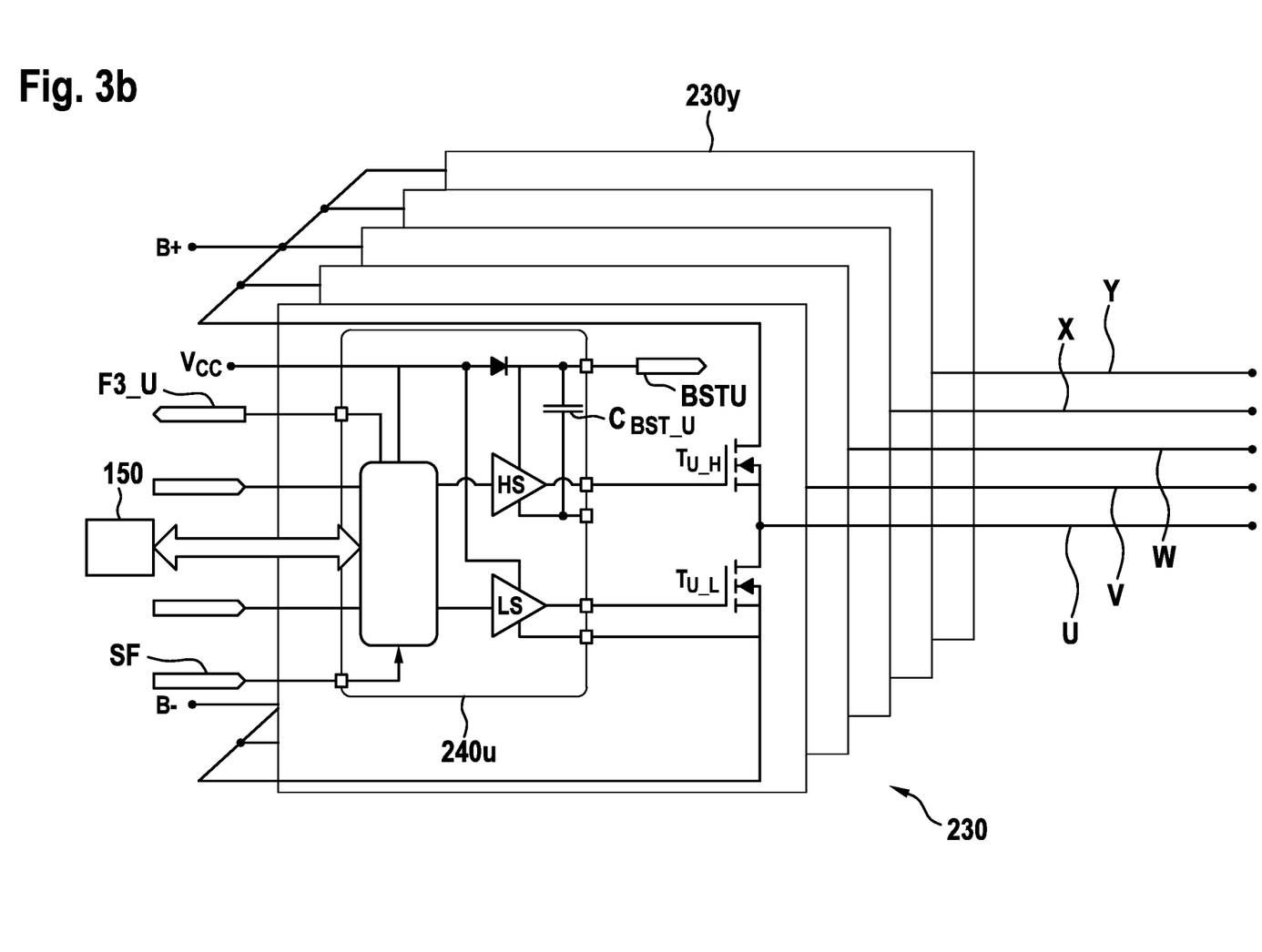

FIGS. 3$a$ and 3$b$ illustrate one preferred embodiment of an activation system 210 according to the invention. The activation system 210 basically corresponds to the activation system 110 according to FIGS. 1 and 2, so that in this regard reference may be made to the description of those figures. The numerical values of the reference symbols are each increased by 100. The following discussion focuses in particular on differences. While a predominant portion of the activation system 210, including a control circuit device 220, is shown in FIG. 3$a$, a converter (or inverter) 230 is shown in FIG. 3$b$.

The activation system 210 includes in particular an activation circuit 240$f$ for the highside switch $T_{F\_H}$ and the lowside switch $T_{F\_L}$ of the control circuit device 220 (see FIG. 3$a$), as well as individual activation circuits 240$u$, etc., for the half bridges (only the half bridge 230$y$ of phase Y is denoted here) of the individual phases U, V, W, X, and Y of the converter 230. The activation circuits 240$f$ and 240$u$, etc., may be separate as shown here, or also suitably combined, for example to form two activation circuits for every three half bridges, as explained for FIGS. 1 and 2.

FIGS. 3$a$ and 3$b$, and also FIG. 2 in part, as well as the subsequent figures illustrate various signals to which particular reference is to be made below, and which therefore are explained briefly beforehand.

It is noted that a signal may assume, for example, one of two values: "0" (or low, i.e., on a low voltage level) and "1" (or high, i.e., on a high voltage level), and thus, for example, may switch an appropriate semiconductor switch or trigger some other action; in addition, an energy supply or current supply or voltage supply may also be provided via a signal. In such a case, the value of the signal is not necessarily important, since an excessively low voltage, for example, automatically means the lack of an energy supply.

Safety signal SF: This is the output signal of a fault detection circuit, and can, for example, check or query various, in particular safety-relevant, signals, and then, if for example one of the signals is not present or not present with the required value, can output the output signal. If all signals deliver the value "1," the output signal or safety signal SF also delivers the value "1"; i.e., everything is satisfactory. If a fault is present, the output signal or safety signal SF delivers the value "0." The fault detection circuit is explained in greater detail with reference to FIGS. 5a and 5b.

Signal or error signal FOC (overcurrent in the excitation winding): The current of $R_{sh}$ or a voltage dropping across $R_{sh}$ is sent (from the current measuring device 252) to a comparator (overcurrent measuring device 254) and compared to the desired setting. If the current exceeds the set threshold value, the guard output is "0," and otherwise is "1."

Signal F1: The MCU grants the additional highside switch Q1 permission to close so that the excitation circuit is operationally ready.

Signal F2: This signal is received from the MCU, and allows the excitation to start. If the value of the signal is "1" (high), and the value of the output signal or safety signal is also "1," the de-excitation switch S1 is closed; otherwise, the de-excitation switch S1 remains open.

F3_F, F3_U, etc.: This signal is present for each activation circuit (driver circuit) for each half bridge, and indicates that the activation circuit detects a fault or abnormal behavior or a requirement for an active short circuit. These signals are supplied to the fault detection circuit, and inform other activation circuits of the fault, etc., and activate the active short circuit of the other activation circuits (for each half bridge) via the safety signal SF.

Signal F4: This signal is output, during a de-excitation of the rotor winding, up to a predefined threshold value, preferably complete de-excitation, and does not change. This signal may be supplied to the fault detection circuit, so that its output signal (the error signal SF) does not change during this time.

BST_F, BST_U etc.: This signal establishes a connection to the positive side of a bootstrap capacitor of a half bridge (F for the control circuit device, U, etc., for the phases or the half bridges in the converter). An energy supply for the additional highside switch Q1 may thus be provided.

Signal V1: This signal involves the measured voltage at the second terminal F− of the control circuit device 120.

Signal V2: This signal involves the voltage, measured by means of a measuring device 246, at the highside switch $T_{F\_H}$, which, for example, may be suitably processed and relayed to the MCU 150.

So-called SPI signals and gate signals, for example, may be exchanged between the activation circuits 240f, 240u, etc., and the MCU 250: A monitoring signal and settings may be transmitted and received via the SPI. The generated PWM signals (for activating the switches) are sent to the activation circuits.

As a supplement to FIG. 1, an additional highside switch Q1 is connected in series with the highside switch $T_{F\_H}$, so that the highside switch $T_{F\_H}$ is redundantly designed. In the absence of a fault or defect, the additional highside switch Q1 is closed or conductively switched. This takes place here via the activation circuit 243, which receives the signals BST_U and BST_F as input. This means that the activation circuit 243 is supplied with energy (or current or voltage) via the activation circuits 240f and 240u.

Thus, as is apparent in FIG. 3a, a voltage is present at the gate of the additional highside switch Q1, across the diodes D1 or D2 and the resistors R1 and R2 (this takes place according to the so-called bootstrap principle: see the capacitors $C_{BST}$ and $C_{BST\_U}$, etc., used in the activation circuits 240f and 240u, etc.). The diodes ensure that no current flows back to the activation circuits 240f and 240u. The diodes form an O-ring in the activation circuit 243, and the circuit may be supplied with power via either $C_{BST}$ or $C_{BST\_U}$.

In addition, a further switch or semiconductor switch Q5 is provided, whose gate is controlled via the signal F1, and at which the error signal SF is present. In the normal state the error signal SF has the value "1," i.e., delivers a voltage. The additional highside switch Q1 may be closed by the signal F1. If a secure state is to be attained, but the highside switch $T_{F\_H}$ is defective and can no longer be opened, this may take place via the additional highside switch Q1. Namely, if the error signal assumes the value "0," the additional highside switch Q1 is opened.

Two diodes D21, D22 by way of example are connected in parallel to the de-excitation switch S1 (as already shown in FIG. 2). An activation of the de-excitation switch S1 takes place via the activation circuit 244, which is shown here in greater detail than the activation circuit 144 in FIG. 2.

In the absence of a fault or defect, the de-excitation switch S1 is closed or conductively switched. The de-excitation switch S1 may be opened if a secure state is to be attained or the rotor winding is to be de-excited. During normal operation a de-excitation may take place via the signal F2, via which the switch Q7 may be switched. However, the de-excitation may also take place via the error signal SF, which controls the switch Q6. The further components (switch Q4, diode D4, resistors R5, R6, R7, R9) are used for the specific implementation of this activation.

Furthermore, a diode DF1 is connected in parallel to the lowside switch $T_{F\_L}$. For the lowside switch $T_{F\_L}$ this also results in a certain redundancy or increases the robustness. If the lowside switch $T_{F\_L}$ should happen to be defective, these diodes ensure the de-excitation operation.

As mentioned, the voltage V1 may be measured at the second terminal F− of the control circuit device 120. Suitable components (capacitor C1, resistors R10, R21, and diodes D5, D6) are provided for this purpose. A voltage supply VDD is 3.3 V or 5 V, for example.

In addition, the signal F4 is tapped or output at the second terminal F− of the control circuit device 120. This may take place via a suitable circuit, in the present case, by means of the resistor R4 and the diode D3 (Zener diode).

Figure 4:
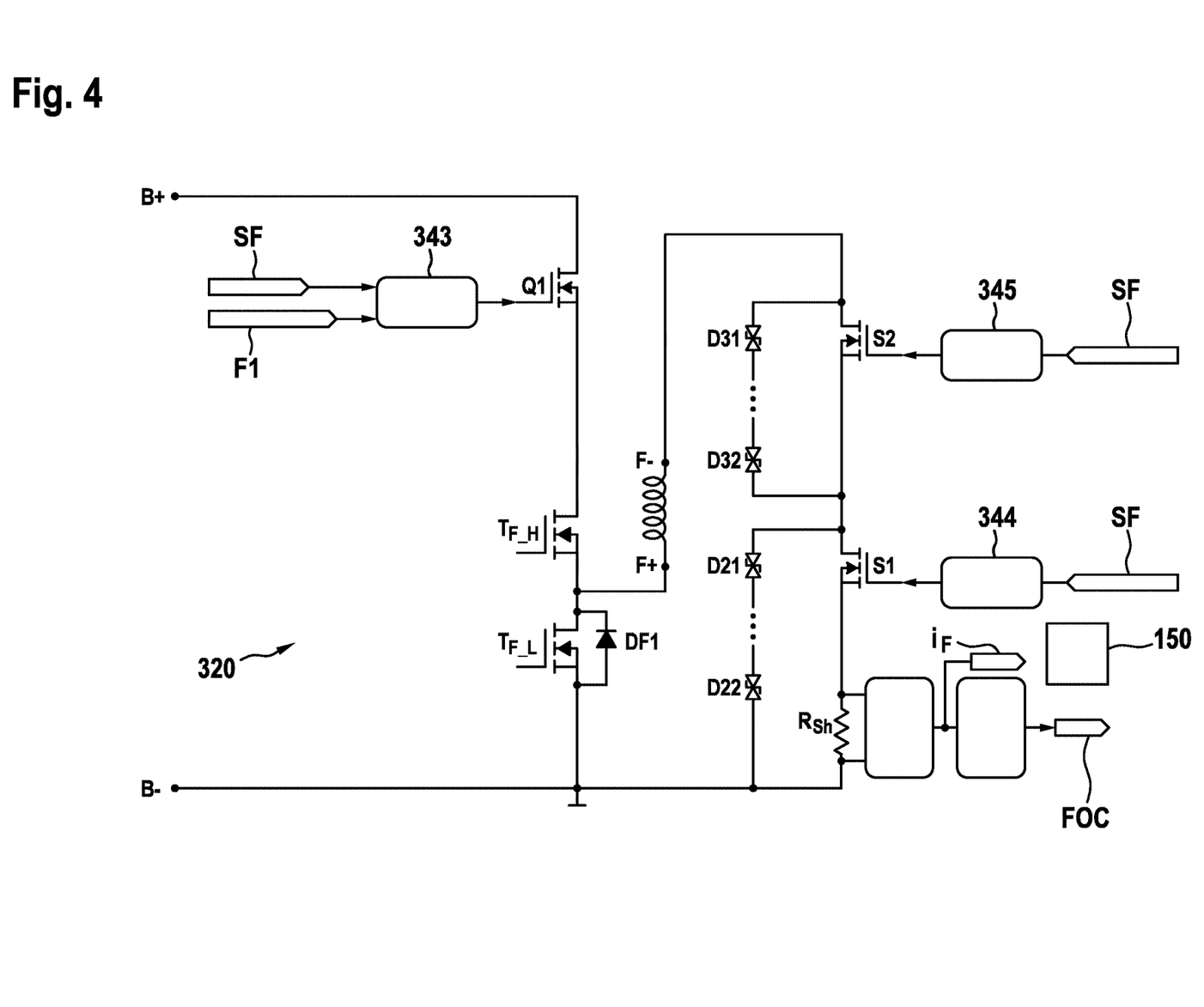
FIG. 4 shows a portion of a further preferred embodiment of an activation system according to the invention.

FIG. 4 shows a portion of an activation system in a further preferred embodiment, namely, a control circuit device 320 or a portion thereof. The activation system or the control circuit device 320 basically corresponds to the activation system 110 or the control circuit device 120 according to FIGS. 1 and 2, or to the activation system 210 or the control circuit device 220 according to FIGS. 3a and 3b, so that in this regard reference may also be made to the description for those figures. The numerical values of the reference symbols are respectively increased by 100 or 200.

One difference from the control circuit device 220 in particular is that an additional de-excitation switch S2 is connected in series with the de-excitation switch S1, so that the de-excitation switch S1 is redundantly designed. The same as for the de-excitation switch S1, two diodes D31, D32 by way of example are also connected in parallel to the additional de-excitation switch S2. These have the same function as the diodes connected in parallel to the de-excitation switch S1, and may be designed in the same way.

In the absence of a fault or defect, the additional de-excitation switch S2, the same as the regular de-excitation switch S1, is closed or conductively switched. If a secure state is to be attained or the rotor winding is to be de-excited, but one of the de-excitation switches is defective and can no longer be opened, this may take place via the respective other de-excitation switch. Two activation circuits 344 and 345 are provided to activate the de-excitation switches S1 and S2, respectively. These may each have the same design as the activation circuit 144 or 244, for example; both activation circuits 344 and 345 receive the error signal SF as input.

Figure 5A:
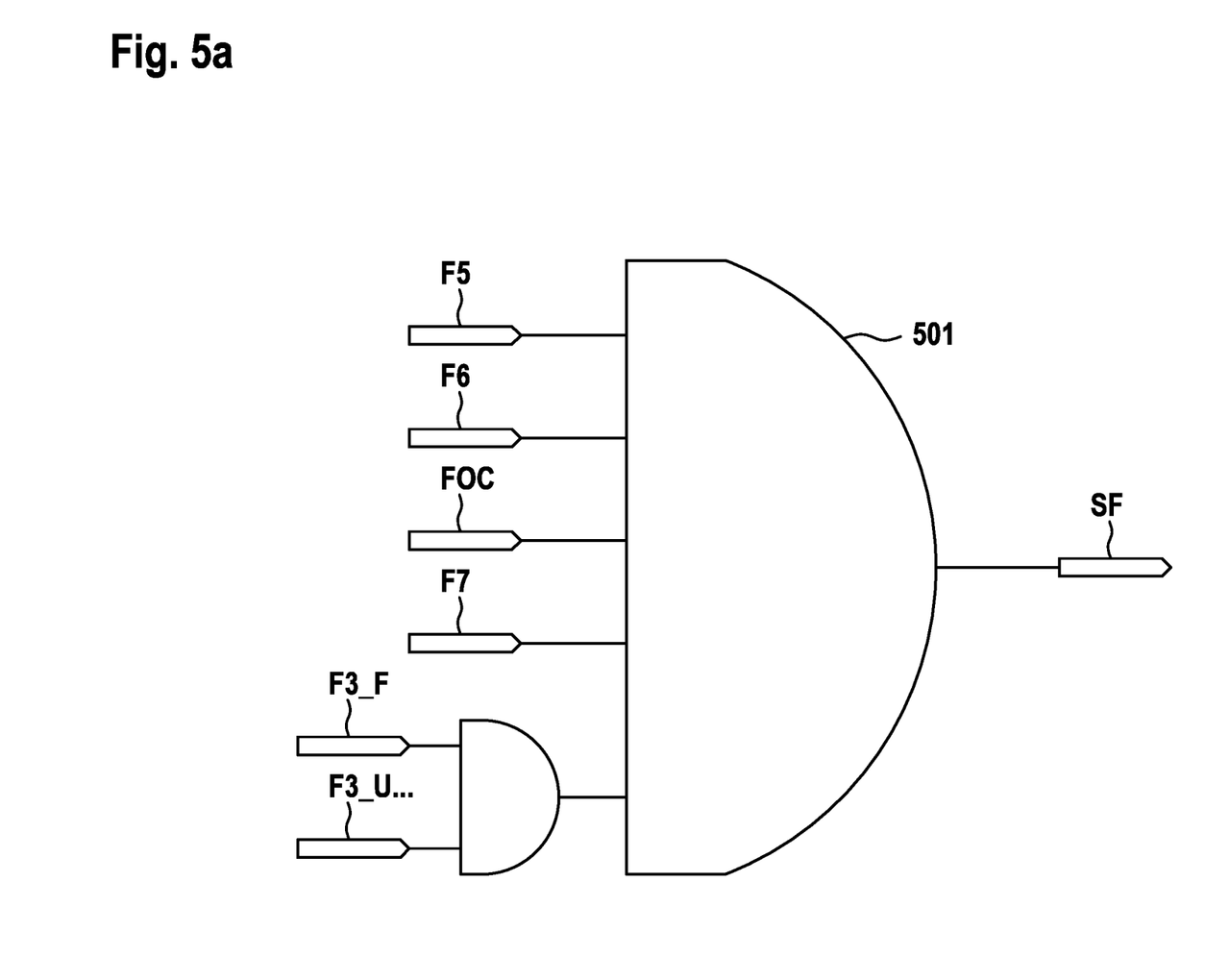
FIGS. 5a and 5b show a portion of a further preferred embodiment of an activation system according to the invention.
Figure 5B:
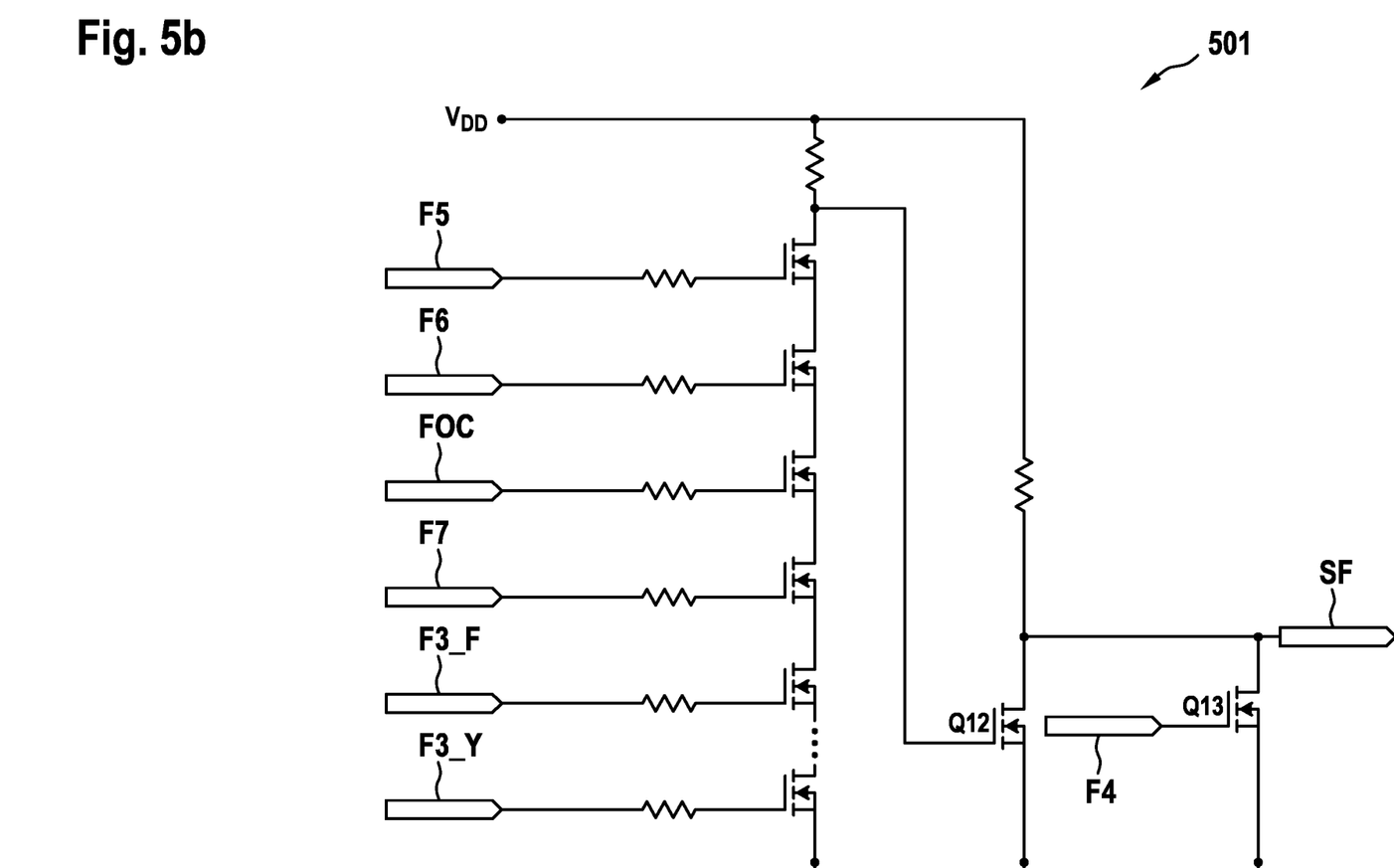

FIGS. 5a and 5b show a portion of a further preferred embodiment of an activation system according to the invention, namely, a fault detection circuit 501. The fault detection circuit is schematically illustrated with its logic system in FIG. 5a, and with a specific wiring in FIG. 5b.

As mentioned above, the fault detection circuit 501 receives, for example, various, in particular safety-relevant, signals. These may be, for example, the signals FOC, F3_F, F3_U, etc., to F3_Y mentioned above, as well as further signals F5, F5, and F7.

The signal F5 is set to the value "0" when, for example, a logic system in the MCU or its software demands a secure state.

The signal F6 is used to monitor the general voltage supply or energy supply. When the monitoring is functioning properly, this signal delivers the value "1," or otherwise the value "0."

The signal F7 indicates whether an overvoltage (at terminal 40, for example) is possibly present. If this is the case, this signal delivers the value "0," or otherwise the value "1."

All these signals are logically AND-linked; i.e., as soon as one of these signals outputs the value "0," the fault detection circuit 501 delivers the value "0" as an output signal (error signal SF). As is apparent in FIG. 5b, this may take place by means of suitable switches (not denoted), which can then switch the switch Q12.

In addition, the signal F4 is also involved here. As long as this signal F4 delivers the value "1" (this is the case as long as the de-excitation of the rotor winding takes place), the switch Q13 is switched, so that the error signal SF delivers the value "0." The output signal or error signal SF is thus left at "0" (locked) during the de-excitation. Namely, when all other signals have been switched to the value "1" in the meantime (in practice, for example all signals except one could already continuously be "1"; i.e., only one signal would have to be switched back to "1"), the output signal or error signal SF would be switched back to "1."

A preferred operation of the electric machine, in particular using the activation system 210, is explained below.

A normal state means that no fault is present, and the activation system can control the electric machine in the regular manner. In this mode the following actions are carried out: All switches of the converter are triggered, for example via a PWM signal from the MCU (or some other type of modulation signal that is generated by the MCU). In order for the electric machine to operated, the excitation must be switched on, and therefore the switches Q1 and S1 (and also S2, if present) are closed (conductively). The switches $T_{F\_H}$ and $T_{F\_L}$ are controlled by the MCU via the activation circuit 240. The excitation current is regulated.

The output signal of the fault detection circuit or the error signal has the value "1," the value of the signal F1 here is "0," and the value of the signal F2 is "1."

If one of the signals FOC, F3_F, F3_U, etc., F5, F6, or F7 assumes the value "0," the safety signal SF likewise switches to "0" (see FIGS. 5a, 5b). The secure state is then activated or prompted, and the converter goes into the secure state, which means that all lowside switches of the converter and also of the control circuit device are closed (conductively switched), and all highside switches are opened (non-conductively switched). The states of the highside switches and of the lowside switches may also be interchanged. It is also conceivable to switch the highside switches and lowside switches back and forth between the states "closed" and "open" at a certain frequency. In all cases, this means an active short circuit.

Thus, the safety signal SF is activated by means of the mechanism; for this purpose a suitable input terminal may be provided at the activation circuits in question, as shown in FIGS. 3a, 3b, for example.

The de-excitation operation begins, and is continued until the energy stored in the rotor winding (excitation coil) reaches zero. The switches Q1 and S1 (and also possibly S2) are open. The error signal SF closes the switch Q6; i.e., if SF has the value "0," the switch Q6 is switched off. The closing of Q6 in turn results in closing of the switch Q4. If SF has the value "0," the switch Q1 is also switched off via the switch Q5 (which may be a depletion MOSFET, for example).

The de-excitation current (a circulating current) flows across the switch $T_{F\_L}$ and the antiparallel diode DF1 (multiple antiparallel diodes could also be provided here), then through the excitation coil, and lastly across the TVS diodes. The circulating current is illustrated in FIG. 2 by a dashed line; this correspondingly applies for FIGS. 3a and 4.

A temporary overvoltage at the TVS diodes D21 and D22 (and also possibly D31 and D32) switches these TVS diodes on, and during this mode the excitation current flows through these diodes. It is noted that an appropriate number of TVS diodes may be selected as a function of the excitation voltage, the transient overvoltage in the de-excitation mode, the thermal resistance of the components, and the power loss of the TVS diodes. The practically constant voltage of the TVS diodes contributes to the coil de-exciting much more quickly than when a discharge resistor is used instead of the TVS diodes (the TVS diodes are shown in FIG. 2).

The mechanism of locking the value of the error signal SF (output signal of the fault detection circuit) by the signal F4 ("latch mechanism") ensures that the value of the error signal SF remains at "0." This ensures that the rotor winding is completely de-excited, and that the de-excitation operation is not possibly interrupted by a change in the error signal SF.

As mentioned, the proposed circuit provides several options (or mechanisms) for ensuring the secure state of the activation system and of the electric machine in the event of a fault.

Fault detection circuit (or state aggregator): A safety function as described above may be implemented in this way. If an (even) higher safety level is desired, a further fault detection circuit may also be used. For example, both may be redundantly used; i.e., for example they receive the same (or for example only a portion of the same) signals as input. It is also conceivable for the MCU to activate (trigger) one or both fault detection circuits. The output signals may then also be wired so that the resulting error signal assumes the value "0" when at least one output signal becomes "0."

Diodes or TVS diodes for the de-excitation: For example, there is a set of TVS diodes and its parallel de-excitation switch S1 (MOSFET, for example). This set may include one or a plurality of diodes. For a higher safety level, for example a second set of such diodes with a second de-excitation switch S2 (see FIG. 4) may also be provided. In the event of a fault in one of the sets, the other set can ensure the de-excitation operation, although at a lower voltage (for example, two TVS diodes instead of four TVS diodes in series), resulting in a slower de-excitation operation compared to using all TVS diodes.

Diode DF1 parallel to the lowside switch, $T_{F\_L}$, of the control circuit device: The switch $T_{F\_L}$ is closed during the de-excitation operation. If this switch, for whatever reason, cannot be opened, the current flows through the parallel diode and also through the body diode of the switch $T_{F\_L}$. Here as well, two or more diodes may be provided in parallel [to the] lowside switch, $T_{F\_L}$. By use of two parallel diodes, for example, each of which can carry the entire current, a laborious diagnosis for the switch $T_{F\_L}$ may be avoided.

Active short circuit with de-excitation due to the error signal SF: The active short circuit is defined, for example, as a short circuit of the lowside switches of phases U, V, W, X, and Y of the converter; i.e., the lowside switches must be closed (conductively switched). The activation circuit or activation circuits (depending on how many activation circuits are used; for example, see individual activation circuits for each half bridge in FIG. 3b) implement or bring about this active short circuit if this is required by the error signal SF; i.e., the error signal has the value "0." It is also conceivable for the active short circuit to be triggered when there is an internal fault of the activation circuit(s).

It is noted that, due to the thermal load on the lowside switches during the active short circuit, there is an option to switch over such an active short circuit between the highside switches and the lowside switches (switchover between highside and lowside switches). To achieve this switchover function, for example an oscillating circuit with an adjustable frequency is necessary in order to change the gate signals of highside switches and lowside switches. Since the switch Q1 is used to disconnect the excitation coil from the positive supply voltage in the secure state, switching over between $T_{F\_H}$ and $T_{F\_L}$ does not represent a problem for the de-excitation operation; the de-excitation current can flow across the diode DF1, for example.

The de-excitation mechanism may be defined, for example, as the disconnection of the coil (rotor winding) from the positive supply terminal B+ by opening the switch Q1 and opening the de-excitation switch S1 (and also possibly S2). The switch $T_{F\_L}$ is closed on account of the active short circuit in question; even if the switch $T_{F\_L}$ remains open, the de-excitation current can flow through DF1 and DF2 (or through the body diode if a MOSFET $T_{F\_L}$ is used).

Excitation current measurement and overcurrent detection of the excitation circuit by the mentioned measuring shunt and overcurrent measuring device: As illustrated in FIG. 2, 3, or 4a, the excitation current may be measured using a shunt resistor or measuring shunt ($R_{sh}$); it is also conceivable to use two or more shunt resistors or measuring shunts. The output of the measured current (i.e., the signal or current $i_F$) is sent to the MCU for control purposes. The overcurrent measuring device monitors the excitation current or field current. If the field current exceeds a certain threshold value, for example (a setpoint value, for example), for a certain period of time, the value of these detection mechanisms (signal) changes from "1" to "0." This results in a secure state by activation of the error signal SF.

It is noted that other types, for example Hall sensors, may be used to measure the excitation current.

To provide a more reliable de-excitation circuit, the diode D22 (or in general, the last diode in the (last) set) may be connected directly to the negative supply terminal or directly to the busbar in question (as shown in FIG. 4). If the measuring shunt fails, the de-excitation circuit is not disconnected, and the de-excitation current continues to flow through the TVS diodes (i.e., D21, D22, D31, and D32, for example). This direct connection of TVS diodes to B− should always be provided when an individual measuring shunt is used.

Diagnosis to check a functionality for attaining the secure state when a fault is present: Such a diagnosis may be part of the safety mechanism or the safety mechanisms. As mentioned, various components or functions may be checked for functionality.

The diagnosis may include checking a functionality of the additional highside switch Q1 and/or of the activation circuit (243, for example) for the additional highside switch. As mentioned, the additional highside switch Q1 is controlled via the error signal SF and the signal F1. These signals control the switch Q5 (MOSFET of the depletion type, for example), and can control the additional highside switch Q1 as follows:

When the error signal SF has the value "1" and the signal F1 has the value "0," the additional highside switch Q1 is closed. In the other three possible combinations of values of the two signals, the additional highside switch Q1 is open. However, it may also be provided (depending on the specific design of the inverter) for the highside switch Q1 to remain closed or to be closed when the error signal SF has the value "1" and the signal F1 has the value "1." In other words, whether or not the highside switch Q1 is open or closed is relevant only for the error signal SF, not for the signal F1.

Before the additional highside switch Q1 can be tested, an energy supply for its activation circuit must be provided; i.e., the bootstrap capacitors, for example $C_{BST}$ and $C_{BST\_U}$ (see FIGS. 4a, 4b) or also different and/or further capacitors must be charged. For this purpose, the highside switches in question, i.e., $T_{F\_H}$ and $T_{F\_U}$, for example, are to be opened and the lowside switches in question of the phases of the inverter are to be closed, at least for a certain time period of 10 ms, for example.

At the start of the diagnosis, the signal F1 may initially assume the value "1"; for the case that no fault is present, the error signal SF is "1," and the voltage at the drain of the highside switch $T_{H\_F}$ of the control circuit device may also be read by the MCU. This voltage should be 0 V.

The signal F1 may assume the value "0" (i.e., the signal should be correspondingly switched). The additional highside switch Q1 is thus to be switched on. At this moment, the voltage at the drain of the highside switch $T_{H\_F}$ of the control circuit device (voltage V2) may be measured or detected by the MCU; this voltage should then correspond to the value of B+, i.e., 48 V, for example. When this is the case, it may be assumed that the additional highside switch Q1 is functional. Depending on the design of the inverter, it may also only be provided, for example, that the error signal SF is switched to the value "0" in order to check the functionality of the highside switch Q1.

The diagnosis may also include checking a functionality of the highside switch $T_{H\_F}$ and/or of the lowside switch $T_{L\_F}$ of the control circuit device and/or of the activation circuit for the highside switch and/or the lowside switch. For this purpose, the additional highside switch Q1 may be switched on, i.e., closed. PWM pulses may then be applied to the highside switch $T_{H\_F}$ and/or the lowside switch $T_{L\_F}$ (or their gates) for a certain time period of 10 ms, for example. The excitation current $i_F$ should hereby reach or exceed a certain value of 0.5 A, for example. When this is the case, it may be assumed that the highside switch $T_{H\_F}$ and/or the lowside switch $T_{L\_F}$ are/is functional.

The diagnosis may also include checking a functionality of the de-excitation switch S1 and/or S2 and/or of an activation circuit for the de-excitation switch. As mentioned, the de-excitation switch S1 and/or S2 may be controlled via the signals SF and F2. Multiple steps may be carried out for the diagnosis.

Thus, initially the additional highside switch Q1 may be switched on (for example, SF may be switched to "1," and F1 to "0"). PWM pulses may then be applied to the highside switch $T_{H\_F}$ and/or the lowside switch $T_{L\_F}$ (or their gates) of the control circuit device. The excitation current $i_F$ may then be measured or detected. This current should be zero, since the de-excitation switch S1 (or S2) is switched off, i.e., open. The value of the signal F2 may then be set to "1.". The excitation current $i_F$ may then be measured or detected anew. This current should now have a value that corresponds to the duty cycle of the PWM pulses. When this is the case, it may be assumed that the de-excitation switch S2 is functional.

The diagnosis may also include checking a functionality of the activation system, and not changing the output signal of the fault detection circuit until the rotor winding is de-excited up to a predefined threshold value, preferably completely de-excited (the so-called "latch mechanism").

For this purpose, the additional highside switch Q1 and the de-excitation switch S1 should be switched on, i.e., closed. PWM pulses may then be applied to the excitation circuit, i.e., the highside switch $T_{H\_F}$ and/or the lowside switch $T_{L\_F}$ (or their gates) for a certain time period of 10 ms, for example. The excitation current $i_F$ should hereby reach or exceed a certain value of 0.5 A, for example. The excitation current $i_F$ should preferably be measured via the measuring shunt and read out by the MCU.

The error signal SF may then be activated, i.e., switched to the value "0," for example via a software command (from the MCU). Within a certain time period of 3 ms, for example, after this activation, all inputs (signals) of the fault detection circuit (see FIGS. 5a, 5b) may be set to the value "1" (via software commands, for example). However, the value of the error signal SF is to retain the value "0." When this is the case, it may be assumed that the "latch mechanism" is functional.

The diagnosis may also include checking a functionality of the at least one diode, i.e., the TVS diodes, for example. For this purpose the additional highside switch Q1 and the de-excitation switch S1 are to be switched on, i.e., closed. PWM pulses may then be applied to the excitation circuit, i.e., the highside switch $T_{H\_F}$ and/or the lowside switch $T_{L\_F}$ (or their gates) for a certain time period of 10 ms, for example. The excitation current $i_F$ should hereby reach or exceed a certain value of 0.5 A, for example. The excitation current $i_F$ should preferably be measured via the measuring shunt and read out by the MCU.

The error signal SF may be activated, i.e., switched to the value "0," for example, via a software command (from the MCU). The voltage at the second terminal F− of the control circuit device 120 (voltage or signal V1) may then be measured or detected. This voltage or its pattern should have the shape of a peak or of a pulse, in particular with a certain duration of 5 ms, for example; this results from switching on the diodes or TVS diodes. The maximum value of the voltage should be the sum of all break-in voltages of the diodes or TVS diodes used. When this is the case, it may be assumed that the diodes or TVS diodes are functional.

The invention claimed is:

1. An activation system (210) for operating an electric machine (102) including a rotor winding (106) and a stator winding (104), including a control circuit device (220, 320) that is configured to be connected to the rotor winding (106) and to activate the rotor winding (106), the control circuit device (220, 320) having a highside switch ($T_{F\_H}$), a semiconductor component ($T_{F\_L}$), in particular a lowside switch, and a de-excitation switch (S1),
   wherein the highside switch ($T_{F\_H}$) is situated in such a way that a first terminal (F+) of the rotor winding (106) is connectable to a positive supply terminal (B+) of the activation system via the highside switch,
   wherein the semiconductor component ($T_{F\_L}$) is situated in such a way that the first terminal (F+) of the rotor winding is connectable to a negative supply terminal (B−) of the activation system via the semiconductor component,
   wherein the de-excitation switch (S1) is situated in such a way that a second terminal (F−) of the rotor winding is connectable to the negative supply terminal (B−) of the activation system via the de-excitation switch,
   wherein the activation system (210) is configured in such a way that during normal operation, when the semiconductor component ($T_{F\_L}$) is conductive and the de-excitation switch (S1) is open for the de-excitation, a de-excitation circuit (K) is formed, via which the rotor winding (106) is de-excited,
   wherein the activation system (210) is configured to attain a secure state, when at least one fault is present, by disconnecting the rotor winding (106) from the positive supply terminal (B+), and/or for a connected rotor winding (106), by de-exciting the rotor winding (106), wherein
   a) the activation system (210) includes an additional highside switch (Q1) that is connected in series with the highside switch ($T_{F\_H}$) so that the highside switch ($T_{F\_H}$) is redundantly designed, and includes an activation circuit (243) for the additional highside switch, the activation circuit being supplied with energy via at least one other activation circuit or partial activation circuit of the activation system, and/or
   b) the activation system (210) includes a fault detection circuit that is configured to bring about attainment of the secure state by means of an output signal, in particular by de-exciting the rotor winding for a connected rotor winding (106), wherein the activation system is configured, when the rotor winding (106) is de-excited via the de-excitation circuit (K), to not change the output signal of the fault detection circuit until the rotor winding is de-excited to a predefined threshold value, preferably completely de-excited, and/or
   c) the activation system (210) is configured, before and/or during a start-up of normal operation, to carry out a diagnosis to check a functionality for attaining the secure state when a fault is present.

2. The activation system (210) according to claim 1, wherein the at least one other activation circuit or partial activation circuit includes an activation circuit or partial activation circuit for activating switches of a converter of the electric machine, in particular a phase, and/or at least the highside switch ($T_{F\_H}$, $T_{F\_L}$) of the control circuit device (220).

3. The activation system (210) according to claim 1, wherein the activation circuit for the additional highside switch is configured to receive the output signal of the fault detection circuit, and to switch the additional highside switch (Q1) based on the output signal.

4. The activation system (210) according to claim 1, wherein the activation system is configured, when the rotor winding (106) is de-excited via the de-excitation circuit (K), to not change the output signal of the fault detection circuit until the rotor winding is de-excited to a predefined threshold value, preferably completely de-excited, by activating a switching mechanism during the de-excitation, in particular by generating a switching signal that ensures that the output signal of the fault detection circuit is not changed.

5. The activation system (210) according to claim 1, wherein the diagnosis includes checking a functionality of the additional highside switch (Q1) and/or of the activation circuit for the additional highside switch (Q1).

6. The activation system (210) according to claim 1, wherein the diagnosis includes checking a functionality of the highside switch ($T_{F\_H}$) and/or of the semiconductor component ($T_{F\_L}$) designed as a lowside switch, and/or of the activation circuit for the highside switch and/or the lowside switch.

7. The activation system (210) according to claim 1, wherein the diagnosis includes checking a functionality of the de-excitation switch (S1) and/or of an activation circuit for the de-excitation switch.

8. The activation system (210) according to claim 1, wherein the diagnosis includes checking a functionality of the activation system to not change the output signal of the fault detection circuit until the rotor winding is de-excited to a predefined threshold value, preferably completely de-excited.

9. The activation system (210) according to claim 1, including at least one diode (D21, D22), in particular a TVS diode or Zener diode, that is connected in parallel to the de-excitation switch (S1) and situated in the de-excitation circuit (K), the diagnosis including checking a functionality of the at least one diode.

10. The activation system (210) according to claim 1 including a converter (130) with multiple half bridges, each having two switches ($T_{U\_H}$, $T_{U\_L}$, $T_{V\_H}$, $T_{V\_L}$, $T_{W\_H}$, $T_{W\_L}$, $T_{X\_H}$, $T_{X\_L}$, $T_{Y\_H}$, $T_{Y\_L}$), the half bridges each being configured to be connected to one of multiple electrical phases of the stator winding, and the converter (130) being configured to activate the stator winding (104), and including one or more activation circuits (240, 242) for activating the switches of the converter and at least the highside switch ($T_{F\_H}$, $T_{F\_L}$) of the control circuit device (220).

11. An electric machine (102) including a rotor winding (106) and stator winding (104), and including an activation system (210) according to claim 1.

12. A method for operating an electric machine (102) including a rotor winding (106) and stator winding (104), and including an activation system (210) according to claim 1, wherein when at least one fault is present during operation, a secure state is attained by disconnecting the rotor winding (106) from a positive supply terminal (B+) and/or de-exciting the rotor winding (106).

* * * * *